US010241127B2

(12) United States Patent
Adams et al.

(10) Patent No.: US 10,241,127 B2
(45) Date of Patent: Mar. 26, 2019

(54) METHOD, APPARATUS AND COMPUTER PROGRAM PRODUCT FOR COLLECTING ACTIVITY DATA VIA A REMOVABLE APPARATUS

(71) Applicant: HERE GLOBAL B.V, Veldhoven (NL)

(72) Inventors: Alistair Adams, San Carlos, CA (US); Joe Chan, Los Altos, CA (US); Duncan Burns, Santa Monica, CA (US); Vidyut Samanta, Santa Monica, CA (US); Stephan Scheunig, Wandlitz (DE); Clovis Scotti, San Francisco, CA (US); Jens-Uwe Söhner, Teltow (DE); James Renwick, Santa Monica, CA (US)

(73) Assignee: HERE Global B.V., Eindhoven (NL)

( * ) Notice: Subject to any disclaimer, the term of this patent is extended or adjusted under 35 U.S.C. 154(b) by 870 days.

(21) Appl. No.: 14/540,261

(22) Filed: Nov. 13, 2014

(65) Prior Publication Data

US 2016/0138935 A1    May 19, 2016

Related U.S. Application Data

(63) Continuation-in-part of application No. 12/512,878, filed on Jul. 30, 2009, now abandoned, and a continuation-in-part of application No. 12/512,809, filed on Jul. 30, 2009.

(51) Int. Cl.
| | | |
|---|---|---|
| *G01P 15/00* | (2006.01) | |
| *G01C 22/00* | (2006.01) | |
| *G01C 19/00* | (2013.01) | |
| *G01C 21/26* | (2006.01) | |

(52) U.S. Cl.
CPC ............ *G01P 15/00* (2013.01); *G01C 21/265* (2013.01); *G01C 22/006* (2013.01)

(58) Field of Classification Search
CPC ..... G01P 15/00; G01C 21/265; G01C 22/006; G01C 22/00; G01S 3/8006
USPC ......................................... 702/150, 141, 147
See application file for complete search history.

(56) References Cited

U.S. PATENT DOCUMENTS

| | | | |
|---|---|---|---|
| 8,734,296 B1 * | 5/2014 | Brumback | .............. G06F 19/00 482/8 |
| 8,783,122 B2 | 7/2014 | Klose et al. | |
| 2012/0232432 A1 * | 9/2012 | Kahn | ................... A61B 5/1038 600/595 |

(Continued)

OTHER PUBLICATIONS

Fitbit [online] [Retrieved Jan. 27, 2015]. Retrieved from the Internet: www.fitbit.com (dated Sep. 30, 2014).

*Primary Examiner* — Sheikh Maruf
(74) *Attorney, Agent, or Firm* — Alston & Bird LLP

(57) ABSTRACT

A method, apparatus and computer program product are provided for collecting activity data with a removably attached mobile device. The mobile device may be moved to various holders configured to be used in different activities. The data is collected according to a determined activity. The start and end of a session is automatically detected based on connectivity to the holder. Metrics may be tracked for specific gear, as well as various spans of time such as sessions, seasons, and/or lifetimes. Milestones and highlights may be determined for various combinations of the various activities, gear and/or terms.

19 Claims, 6 Drawing Sheets

(56) References Cited

U.S. PATENT DOCUMENTS

| | | | |
|---|---|---|---|
| 2012/0277892 A1* | 11/2012 | Vock | G01P 3/50 700/91 |
| 2012/0309412 A1* | 12/2012 | MacGougan | G06F 1/1694 455/456.1 |
| 2013/0116966 A1* | 5/2013 | D'Jesus Bencci | G01C 21/20 702/150 |
| 2013/0173212 A1* | 7/2013 | Saiki | G01P 13/00 702/150 |
| 2013/0174660 A1* | 7/2013 | Imasaka | B60R 11/02 73/493 |
| 2014/0019083 A1* | 1/2014 | Nakaoka | A63B 69/36 702/141 |
| 2014/0039804 A1* | 2/2014 | Park | A61B 5/0002 702/19 |
| 2014/0066816 A1* | 3/2014 | McNames | A61B 5/002 600/595 |
| 2014/0081592 A1* | 3/2014 | Bellusci | G01R 33/0064 702/141 |
| 2014/0099614 A1* | 4/2014 | Hu | G09B 19/00 434/236 |
| 2014/0107493 A1* | 4/2014 | Yuen | A61B 5/0205 600/473 |
| 2014/0135631 A1* | 5/2014 | Brumback | A61B 5/02438 600/479 |
| 2014/0172358 A1* | 6/2014 | Vock | A43B 3/00 702/150 |
| 2014/0278139 A1* | 9/2014 | Hong | A61B 5/4866 702/19 |
| 2014/0278218 A1* | 9/2014 | Chang | G01P 15/00 702/150 |
| 2014/0278220 A1* | 9/2014 | Yuen | G01B 21/16 702/150 |
| 2014/0278229 A1* | 9/2014 | Hong | A61B 5/7455 702/160 |
| 2014/0288435 A1* | 9/2014 | Richards | A61B 5/02427 600/479 |
| 2015/0081247 A1* | 3/2015 | Valentino | G01P 13/00 702/150 |
| 2015/0094832 A1* | 4/2015 | Brumback | G16H 40/63 700/91 |
| 2015/0287338 A1* | 10/2015 | Wells | G09B 19/0038 702/19 |
| 2015/0354949 A1* | 12/2015 | Lecky | G06F 3/017 702/150 |
| 2016/0066844 A1* | 3/2016 | Venkatraman | A61B 5/0002 702/141 |

\* cited by examiner

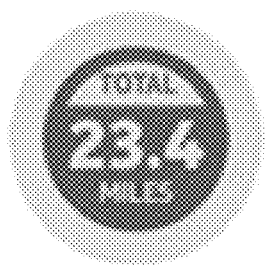
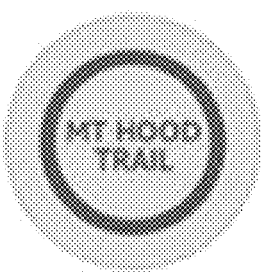
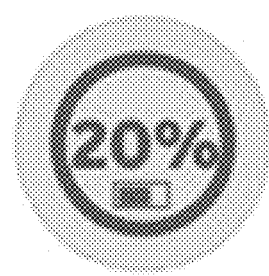
Figure 6A    Figure 6B    Figure 6C
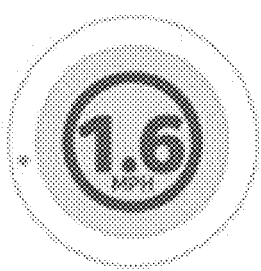
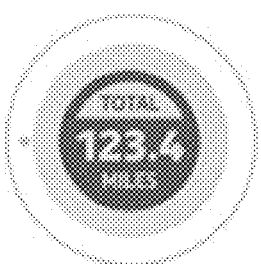
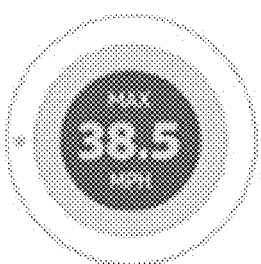
Figure 6D    Figure 6E    Figure 6F
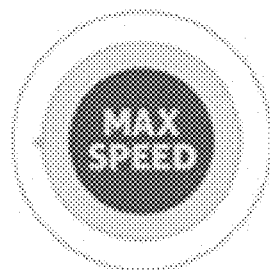
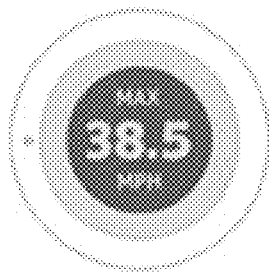
Figure 6G    Figure 6H

METHOD, APPARATUS AND COMPUTER PROGRAM PRODUCT FOR COLLECTING ACTIVITY DATA VIA A REMOVABLE APPARATUS

TECHNOLOGICAL FIELD

An example embodiment of the present invention relates generally to collecting activity data, and more particularly, to a method, apparatus and computer program product for collecting activity data from a mobile device removably attached to a holder.

BACKGROUND

In today's society, physical activity is often a healthy outlet for working professionals. The activities may provide health benefits and stress relief. These high achievers yearn to feel in control and achieve personal success.

Some individuals may participate in a variety of activities such as hiking, skiing, biking, surfing, and/or the like. These active people may wish to measure achievements by collecting data relating to their activities for the purpose of self-improvement, competition with others, managing a training schedule, tracking maintenance of equipment, and/or the like.

Many devices designed to capture activity data are specific to a single activity. Some devices designated for some activities such as walking or hiking, may not be configured to capture the desired data for a fast moving activity such as bicycling or skiing. Even those that are configured to change modes for various activities may require a manual mode change by the user, and user input at the start and end time of the input.

The size of a device and/or method of attachment of the device to the user's body may also be inconvenient or obtrusive. Many fitness monitors are wrist mounted which may cause discomfort for some activities such as bicycling, or may be inaccessible under clothing such as for a skier.

A smartphone may be configured to capture activity data, however, strapping a smartphone to different parts of a user's body or equipment is not always practical and may be obtrusive during the activity. Furthermore, smartphones may not provide the durability required by such active users. For example, smartphones are typically not waterproof. In addition, the battery capacity of a smartphone may not always be adequate to supply the necessary power to operate the precise global positioning capabilities that may be needed to capture data during certain activity.

BRIEF SUMMARY

A method, apparatus, and computer program product are therefore provided for collecting activity data with a removably attached mobile device.

In an example embodiment, a method for collecting activity data is provided. The method includes receiving an indication that the apparatus is connected to a holder, and receiving an indication of a detected movement. The method may include identifying an activity type based on at least one of a holder identifier or the movement of the apparatus. The method also includes identifying a plurality of metrics for which to collect the activity data based on the activity type, and collecting the activity data for the identified plurality of metrics.

In some examples, the method additionally includes determining that the activity type is an activity comprising phases. Collecting the activity data comprises distinguishing between the phases. In some embodiments, the method includes receiving an indication that the apparatus is removed from the holder, and receiving an indication that the apparatus is returned to the holder within a threshold amount of time. In response to receiving the indication that the apparatus is returned to the holder within the threshold amount of time, the method includes resuming collecting the activity data in a same session.

In some embodiments, the method includes receiving an indication that the apparatus is removed from the holder in a first location, and receiving an indication that the apparatus is returned to the holder in a second location that is a greater distance from the first location than a threshold distance. In response to receiving the indication that the apparatus is returned to the holder in a second location that is a greater distance from the first location than a threshold distance, the method includes resuming collecting the activity data in a different session.

In some examples, the method includes associating the collected activity data with a particular piece of gear, and tracking milestones for the activity type and the particular piece of gear. In some examples the method includes tracking milestones for at least one of a session, season, or lifetime.

An apparatus is also provided for collecting activity data. The apparatus comprises at least one processor and at least one memory including computer program code. The at least one memory and the computer program code configured to, with the processor, cause the apparatus to perform at least receiving an indication that the apparatus is connected to a holder and receiving an indication of a detected movement.

In some examples, the memory and the computer program code are configured to cause the apparatus to perform identifying an activity type based on at least one of a holder identifier or the movement of the apparatus, identifying a plurality of metrics for which to collect the activity data based on the activity type, and collecting the activity data for the identified plurality of metrics.

In some examples, the at least one memory and the computer program code are further configured to, with the processor, cause the apparatus to perform at least determining that the activity type is an activity comprising phases. Collecting the activity data includes distinguishing between the phases.

In some embodiments, the at least one memory and the computer program code are further configured to, with the processor, cause the apparatus to perform at least receiving an indication that the apparatus is removed from the holder and receiving an indication that the apparatus is returned to the holder within a threshold amount of time. In response to receiving the indication that the apparatus is returned to the holder within the threshold amount of time, the memory and computer program code cause the apparatus to resume collecting the activity data in a same session.

In some embodiments, the at least one memory and the computer program code are further configured to, with the processor, cause the apparatus to perform receiving an indication that the apparatus is removed from the holder in a first location and receiving an indication that the apparatus is returned to the holder in a second location that is a greater distance from the first location than a threshold distance. In response to receiving the indication that the apparatus is returned to the holder in a second location that is a greater distance from the first location than a threshold distance, collecting the activity data may resume in a different session.

In some embodiments, the at least one memory and the computer program code are further configured to, with the processor, cause the apparatus to perform associating the collected activity data with a particular piece of gear, tracking milestones for the activity type and the particular piece of gear, and/or tracking milestones for at least one of a session, season, or lifetime.

A computer program product for collecting activity data is provided. The computer program product comprises at least one non-transitory computer-readable storage medium having computer-executable program code instructions stored therein, with the computer-executable program code instructions comprising program code instructions for receiving an indication that an apparatus is connected to a holder, and receiving an indication of a detected movement. The computer-executable program code instructions may further include program code instructions for identifying an activity type based on at least one of a holder identifier or the movement of the apparatus, identifying a plurality of metrics for which to collect the activity data based on the activity type, and collecting the activity data for the identified plurality of metrics.

The computer-executable program code instructions may further include program code instructions for determining that the activity type is an activity comprising phases. Collecting the activity data may therefore include distinguishing between the phases.

In some examples, the computer-executable program code instructions may further include program code instructions for receiving an indication that the apparatus is removed from the holder, receiving an indication that the apparatus is returned to the holder within a threshold amount of time, and in response to receiving the indication that the apparatus is returned to the holder within the threshold amount of time, resuming collecting the activity data in a same session.

In some embodiments, the computer-executable program code instructions may further include program code instructions for receiving an indication that the apparatus is removed from the holder in a first location and receiving an indication that the apparatus is returned to the holder in a second location that is a greater distance from the first location than a threshold distance. In response to receiving the indication that the apparatus is returned to the holder in a second location that is a greater distance from the first location than a threshold distance, collecting the activity data may resume such that the data is collected in a different session.

In some embodiments, the computer-executable program code instructions may further include program code instructions for associating the collected activity data with a particular piece of gear, tracking milestones for the activity type and the particular piece of gear, and/or tracking milestones for at least one of a session, season, or lifetime.

An apparatus is also provided for collecting activity data. The apparatus includes means for receiving an indication that the apparatus is connected to a holder and means for receiving an indication of a detected movement. In some examples, the apparatus further includes means for identifying an activity type based on at least one of a holder identifier or the movement of the apparatus, means for identifying a plurality of metrics for which to collect the activity data based on the activity type, and means for collecting the activity data for the identified plurality of metrics.

BRIEF DESCRIPTION OF THE DRAWINGS

Figure 1:
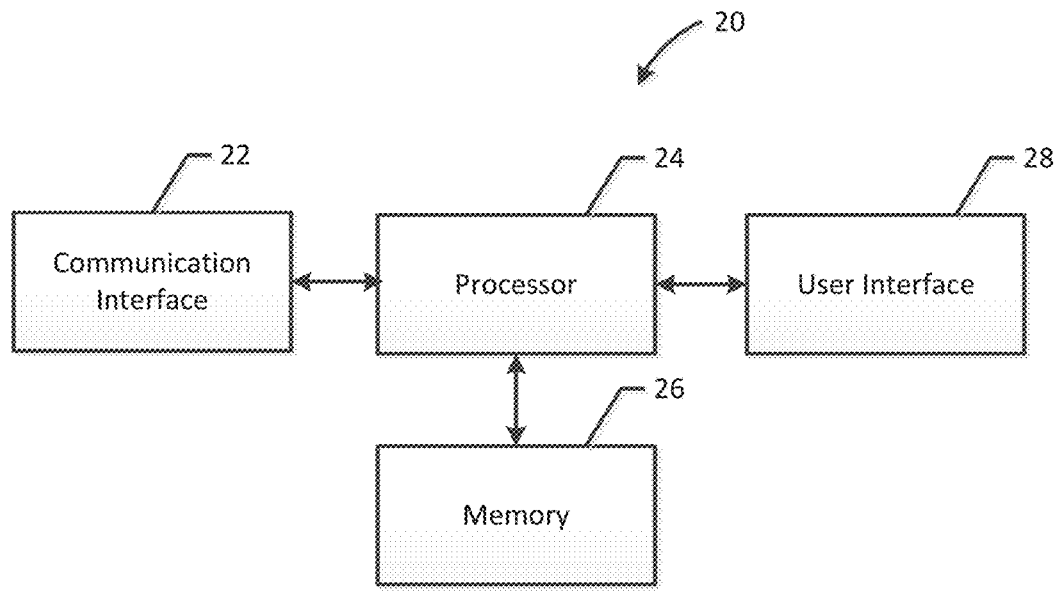
Figure 2:
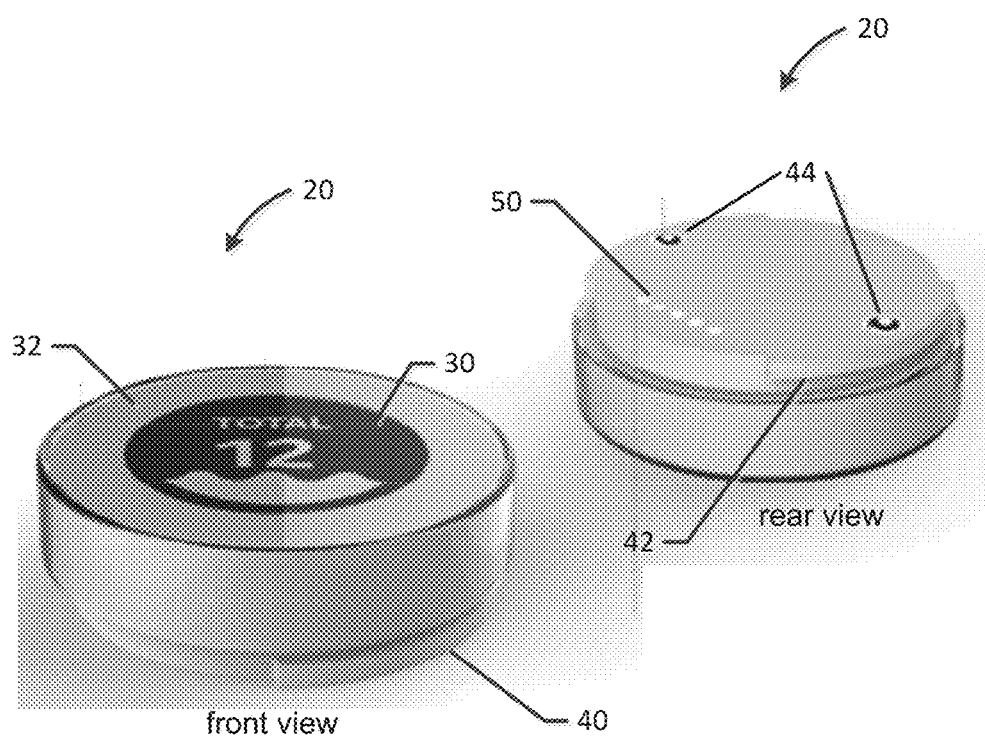
Figures 3A, 3B:
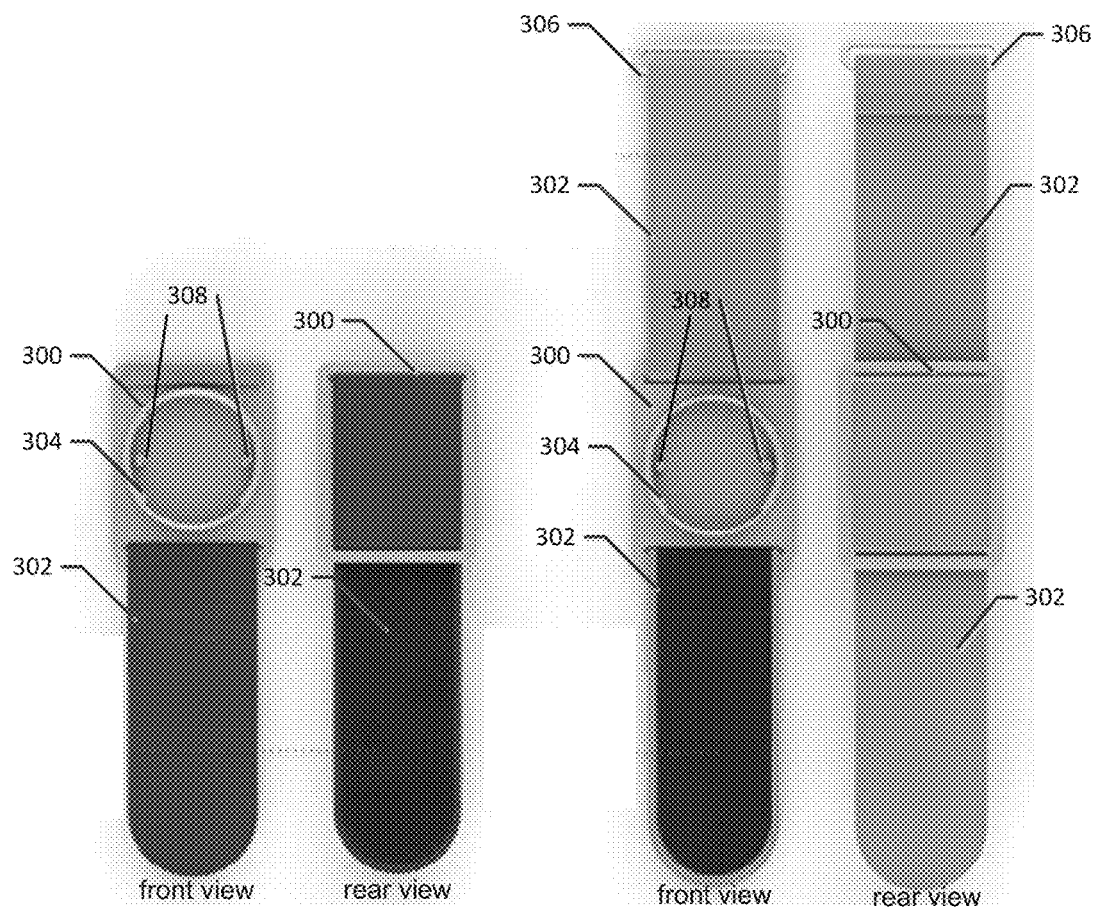
Figure 4:
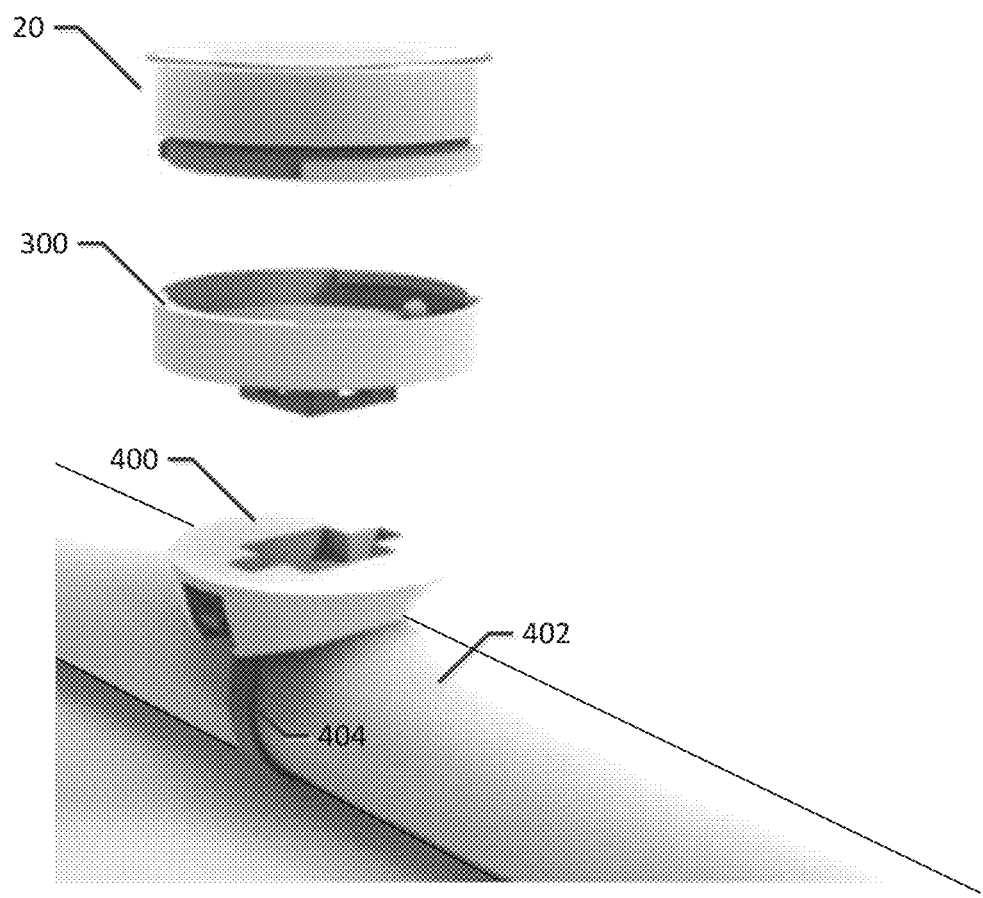
Figure 5:
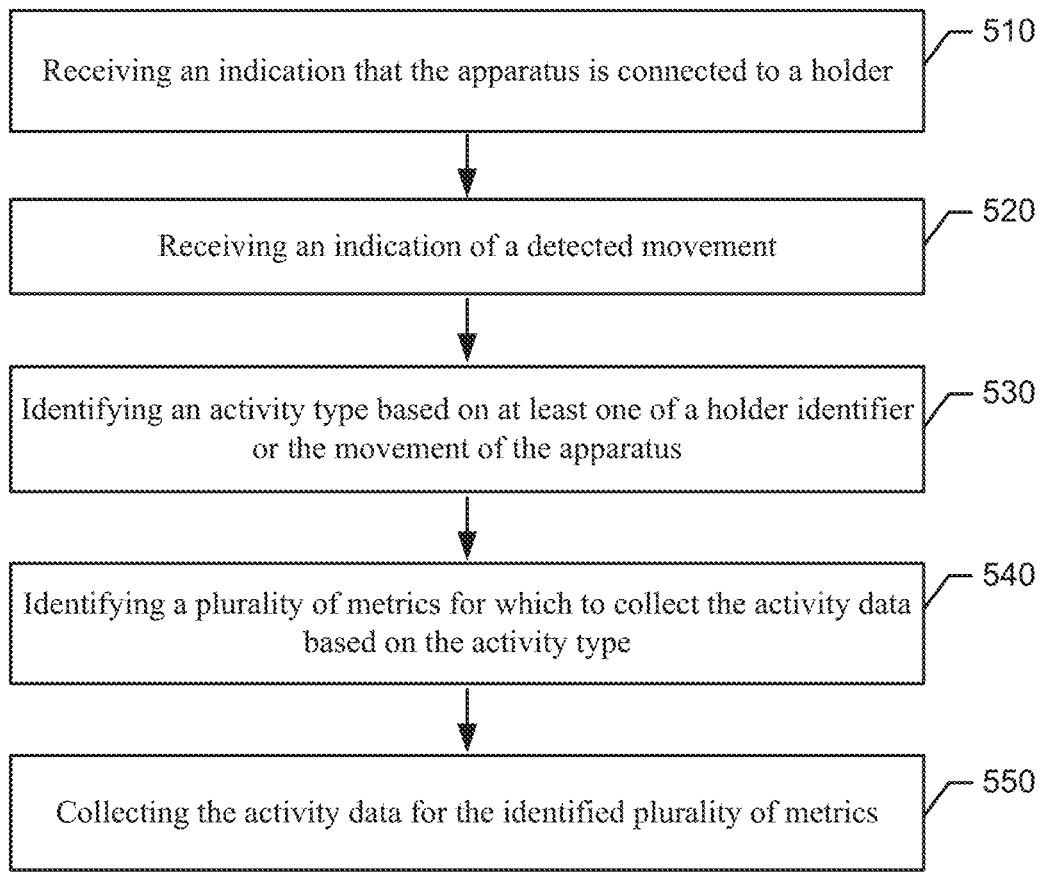

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is an illustration of an apparatus according to an example embodiment;

FIGS. 3A-3B are illustrations of a wristband holder according to an example embodiment;

FIG. 4 is an illustration of a bicycle holder according to an example embodiment;

FIG. 5 is a flowchart of operations for collecting activity data according to an example embodiment;

FIGS. 6A-6H are example user interfaces according to an example embodiment; and

Figure 7:
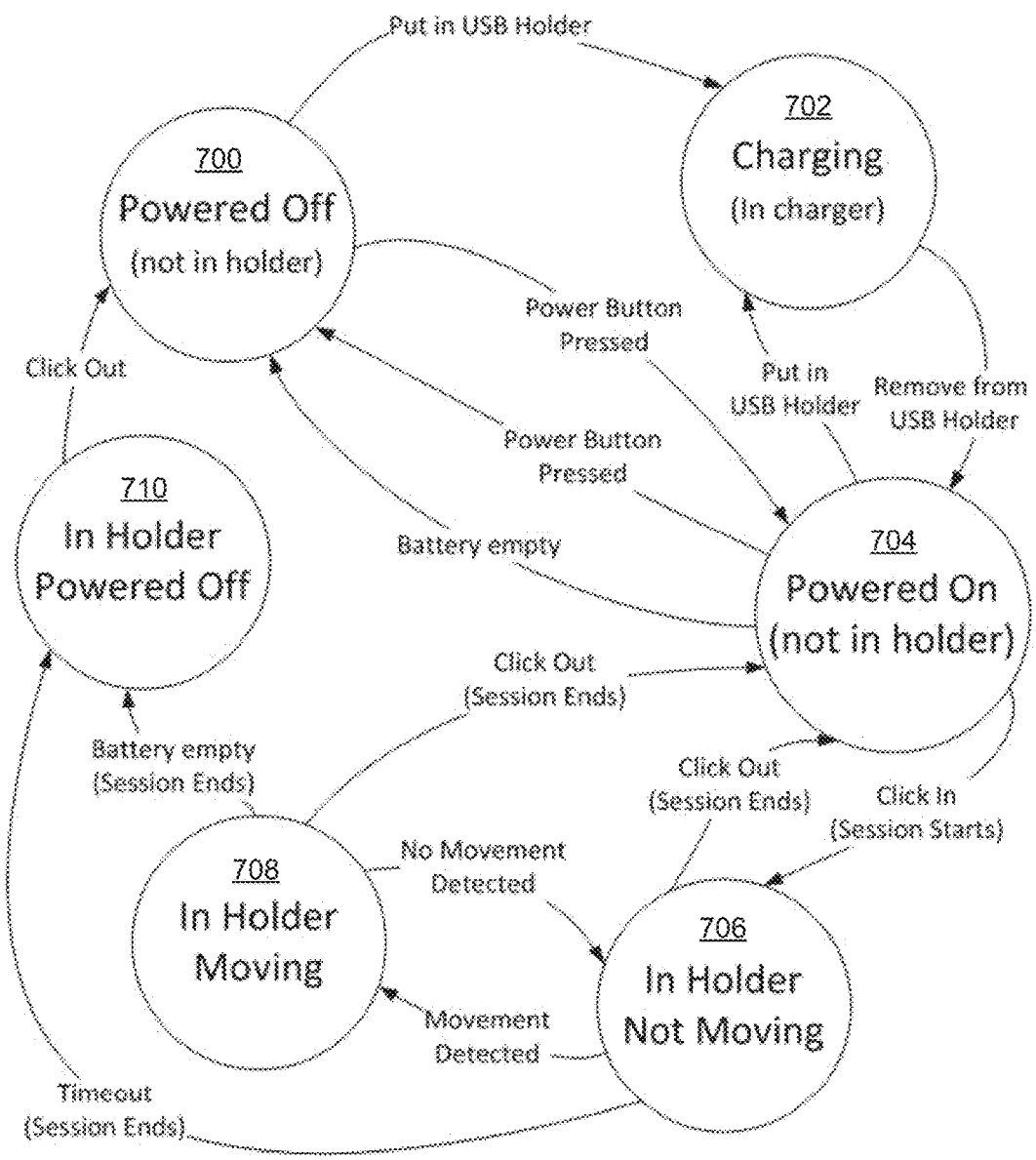

FIG. 7 is a state diagram of an apparatus according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for collecting activity data with a removably attached mobile device. In this regard, a mobile device including various sensors for detecting activity data may be affixed to a holder. Numerous holders may be attached to a variety of equipment and/or gear for use by the same user. When switching between activities, the user removes the mobile device from one piece equipment (and/or the user's body, such as with a strap), and places it on another. A holder used to secure the mobile device is designated for a particular activity type and/or the piece of equipment such as clothing or other gear carried with or on the user's body. Therefore metrics and data collected by the sensors of the mobile device may be categorized and/or grouped accordingly. Consequently, the user does not need to provide input to the mobile device to indicate the activity type.

Furthermore, the mobile device may detect a session start or end by connection or removal of the mobile device and the holder. The mobile device may therefore collect activity data such that the activity data may be subsequently analyzed according to specific activity types, gear, and/or sessions. In some instances, the activity data is analyzed in real-time or near real-time to provide feedback to the user.

The mobile devices measures and calculates activity-specific, multi-level session motion metrics and highlights, without requiring the user to tediously start/end activity sessions or enter the activity. Rather, the mobile device intelligently alters its operation to achieve the foregoing based on at least whether and how the mobile device is moving, whether the device is locked into a holder, and if so, what type of holder. Furthermore, activity-specific or session-specific milestones are automatically detected and tracked such that reaching a milestone triggers an alert via a user interface of the mobile device.

FIG. 1 is a schematic diagram of an example apparatus configured for performing any of the operations described herein. Apparatus 20 is an example embodiment that may be embodied by or associated with any of a variety of computing devices that include or are otherwise associated with a mobile device configured for collecting a user's activity data. For example, the mobile device may be a relatively small computing device comprising circuitry configured according to the example embodiments described herein. An example embodiment of the mobile device measures only 43 millimeters in diameter with a height of 13 millimeters.

The apparatus 20 may be equipped with any number of sensors, such as a global navigation satellite system (GNSS), accelerometer, gyroscope, magnetometer, and/or pressure sensor. Any of the sensors may be used to collect activity data as described herein according to example embodiments.

Apparatus 20 may additionally be configured for wireless connectivity. The mobile device and, therefore, the apparatus, may communicate with other devices (e.g., an application or "app" operative on a smartphone). Such communication may be performed via Bluetooth™, Bluetooth™ Low Energy (BLE) and/or any near field communication (NFC) protocol or other proximity based communication technique. Apparatus 20 may therefore transmit data to an external device. A mobile application or app operative on the external device may in turn upload data to a user's cloud account. Therefore, the apparatus 20 may be embodied by or associated with a plurality of computing devices that are in communication with or otherwise networked with one another such that the various functions performed by the apparatus may be divided between the plurality of computing devices that operate in collaboration with one another. However, the apparatus may be embodied by other types of computing devices as noted above.

The apparatus 20 may include, be associated with or otherwise in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret motion data collected by its sensors and translate the data into direct user feedback on the built-in display using text and graphics, such as those relating to time, speed, distance, elevation and location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by Bluetooth™ and/or near field communication, described above. In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication.

The apparatus 20 may comprise an NFC, RFID (radio frequency identification), or other proximity based communications tag configured to communication with other components, such as a holder and/or charger configured to be removably connected to the apparatus 20. In this regard, a holder may also comprise an NFC, RFID, or other proximity based communications tag, configured such that the processor 24 of the apparatus 20 may identify what type of holder and/or charger, or what specific holder and/or charger, the apparatus 20 is connected to, if any, at a given time. While the apparatus 20 and/or holder is commonly described herein as comprising an NFC tag, it will be appreciated that RFID or other proximity based communication protocols may be used.

An example apparatus 20 is illustrated in and described with respect to FIG. 2, while example holders are illustrated in and described with respect to FIGS. 3A and 3B.

FIG. 2 illustrates an example apparatus 20 according to an example embodiment. The apparatus 20 includes a display 30, such as with a clear top cover 32 that protects the display.

The housing and/or casing of the apparatus 20 may be constructed such that the apparatus 20 is water, shock, and/or dust proof.

The housing of the apparatus 20 may be characterized by lock, such as a twist lock mechanism 40, made of metal injection molding (MIM), for example, that may be configured such that the apparatus 20 may be removably fastened to a holder, such as described with respect to FIGS. 3A, 3B and 4. The apparatus 20 may be fastened to a holder by twisting and locking the twist lock mechanism 40 to a twist lock mechanism of a holder. Furthermore, indentations 44 on the apparatus 20 may be provided to securely fasten the apparatus 20 to a holder. These fastening mechanisms may ensure that the NFC tags are properly positioned and/or aligned such that the apparatus 20 may recognize the particular holder to which it is attached.

Charging receptacles or charging plates 50 of the charger may align with charging receptacles on a charger such that a battery of the apparatus 20 (not illustrated) may therefore be charged. Power may be retained for subsequent use, even when removed from the charger. The charger may be powered by a standard electric cord which may be connected to the charger such as with an adapter and/or universal serial bus (USB). The charger may be configured to charge the apparatus 20 when the charging plates 50 of the apparatus 20 are aligned with the pins, prongs or plates of the charger configured to transmit a current to charge the apparatus 20. In some examples, the charger may also be powered by a personal computer and/or the like. The above described configurations are provided merely as example and it will be appreciated that other methods to charge the apparatus 20 may be used.

FIGS. 3A and 3B illustrate two example holders 300 to which the apparatus 20 may be removably attached. Front and rear views of each example are provided. The holder 300 may be secured to a strap 302 that may in turn secure to a user's body, equipment, and/or gear for use during a particular activity or activities, such as running, hiking, and/or the like. The holder 300 may comprise a lock, such as a twist lock mechanism 304, such that a user may removably connect the apparatus 20 to the holder 304 by twisting and locking the twist lock mechanism 40 to a corresponding lock, such as the twist lock mechanism 304 of the holder. The strap may be made of fast drying neoprene material and/or the like and may additionally or alternatively include a Velcro® portion for securing the strap 302 on the user's body, equipment, and/or gear. As such, the apparatus 20 may be attachable to anything, such as outdoor sports-related gear including, but not limited to, snowboards, skis, surfboards, bikes, skateboards, helmets, shoes, bags and/or clothing.

A metal loop 306 may be provided for locking and/or securing the strap in place on the user's body, equipment, and/or gear. Two protrusions 308 enable a secure fastening to the apparatus 20, with the indentations 44 of the apparatus 20. The holder 300 may comprise NFC tags (not illustrated) such that the apparatus 20 may detect when the apparatus 20 is connected to a particular holder 300.

While NFC tags are described throughout as example means for detection of a connection between the apparatus 20 and holder 300, it will be appreciate that other methods may be provided. For example, a fastening element may be coded in such a way that a fastening mechanism may emit an identification code and therefore the type of the fastening element and/or the position on the body. For example, an analog code, a magnetic code, a mechanical code, and/or radio frequency-based communication element are suitable as an element for the identification code of the fastening element. For example, a chip having a stored identifier may be integrated into the fastening element. A code based on a contact-based communication, for example, a so-called iButton (1-wire® RFID alternative) or a NFC, which is based on the RFID system, is suitable, for example. A resistance between two measuring points may be established as an analog code, for example. In the case of a magnetic code, for example, a field strength may serve as the identifier. A mechanical code may be provided or a binary code, such as by short-circuiting different contacts, for example. Regardless of implementation, the apparatus 20 may detect the activity type of a user based on the holder 300 to which the apparatus 20 is attached.

FIG. 4 illustrates another example holder 300 according to an example embodiment. In this scenario, the example configuration may be useful in fastening the apparatus 20 to a bicycle or other equipment. Silicone or thermoplastic polyurethane (TPU) base 400 may fasten to the bicycle 402 or other equipment, with a zip tie 404, for example. The holder 300 may be configured such that it locks in place when coupling the holder 300 with the base 400 and rotating the holder 300 90 degrees so that it attaches to the base 400. In this regard, the same apparatus 20 may be easily removed from one holder, such as a holder attached to a strap such as that in FIGS. 3A and 3B, to another holder 300, such as that of FIG. 4.

Numerous holders 300 belonging to the same user, may be uniquely identified by NFC tags embedded in the holder, as described above. In some examples, a user may configure the apparatus 20 such that the apparatus 20 recognizes what type of activity the holder 300 is designed for. Furthermore, connecting an apparatus 20 to a holder 300 may signal to the apparatus 20 to begin collecting activity data for the appropriate activity, as described in further detail herein according to example embodiments.

FIG. 5 is a flowchart of operations for collecting activity data with a removable apparatus such as apparatus 20. As shown by operation 510, the apparatus 20 may include means, such as communication interface 22, processor 24, memory 26, and/or the like, for receiving an indication that the apparatus is connected to a holder. For example, as described above, the apparatus 20 and/or various holders 300 may include embedded NFC tags such that when the apparatus 20 is connected to a holder 300, the NFC tag may signal to the processor 24 that the apparatus 20 is connected to a holder 300.

As shown by operation 520, the apparatus 20 may include means, such as processor 24, and/or the like, for receiving an indication of a detected movement. As described above, the apparatus 20 may include a number of sensors, such as a GNSS, accelerometer, gyroscope, magnetometer, pressure sensor and/or the like. The processor 24 may therefore receive an indication from any of the sensors when movement of the apparatus 20 is detected.

As shown by operation 530, the apparatus 20 may include means, such as communication interface 22, processor 24, memory 26 and/or the like, for identifying an activity type based on at least one of a holder identifier or the movement of the apparatus. For example, memory 26 may be configured to store a list if holder identifiers, as identified by an NFC tag in each respective holder 300. Any identifier of the holder 300 may be communicated to the apparatus 20 via the communication interface 22 and referenced in the memory 26 to determine the associated activity type.

For example, a user may configure the apparatus 20 upon initial connection of the apparatus 20 with a particular holder 300. Upon connecting apparatus 20 to an unrecognized holder 300, the user may be prompted via user interface 28 to indicate an activity type to associate with the particular holder 300. For example, a user may indicate that a particular holder 300 is intended to be used on a bicycle. In some examples, the user may even provide a name of a bicycle associated with the apparatus 300 such that the apparatus 20 may distinguish between different bicycles, such as a downhill mountain bike, road bike, time trial bike, and/or the like. Once configured, a holder identifier may be associated with a corresponding activity type, and stored on memory 26, for example. In this regard, when the apparatus 20 detects a particular holder 300 that has been previously configured, the apparatus 20 determines an intended activity type.

Additionally or alternatively, if a holder 300 does not signal to the apparatus 20 an identifier recognized by the apparatus 20, the apparatus 20 may analyze motion data collected by any of the sensors to determine an activity type. For example, historical data, or otherwise stored activity data on memory 26 may enable the processor 20 to determine an activity type. For example, when motion data indicates a near steady speed of 7 miles per hour, the processor 24 may determine the activity type to be running, whereas average speeds of 18 miles per hour may be indicative of cycling. Even further, a phase including high speeds paired with sharp decreases in elevation, followed by slow speed and gradual increases in elevation, may be recognized as motion data of a skier skiing downhill runs and riding the chairlift back to the top.

As shown by operation 540, the apparatus 20 may include means, such as processor 24, memory 26 and/or the like, for identifying a plurality of metrics for which to collect the activity data based on the activity type. For example, as stored in memory 26, an activity type of running may indicate that speed and elevation changes should be collected. An activity type of bicycling may indicate that speed, elevation change, and cadence should be collected. In this regard, the apparatus 20 may be configured to receive data from other devices in close proximity to the apparatus 20, such as a cadence sensor, power meter, and/or the like. The various devices may communicate to the apparatus 20 by Bluetooth™ or other proximity based communication techniques. The processor 24 may identify any number of metrics to be collected using any of the sensors or external devices. Identifying the plurality of metrics based on the activity type is described in further detail with respect to Table 3 below.

As shown by operation 550, the apparatus 20 may include means, such as processor 24, memory 26 and/or the like, for collecting the activity data for the identified plurality of metrics. In this regard, as data is received from and of the sensors or external devices (such as via communication interface 22), the data may be stored on memory 26. The data may be subsequently transferred to another device for more detailed analysis.

In some embodiments, such as the skiing example, the apparatus 20, such as with processor 24, determines that the activity type is an activity comprising phases, such that collecting the activity data comprises distinguishing between the phases. The apparatus 20 may therefore collect metrics while the user is skiing and while the user is riding the chairlift, but may distinguish between the phases and the types of metrics collected during each phase by an indicator stored with the data in memory 26. For example, the data collected while the user is skiing may be associated with a "run," while the chairlift time may be associated with a "non-run." Distinguishing between runs and non-runs may provide for improved data analytics by the user without having to manually switch modes on the apparatus 20 between runs. For example, average speeds may be calculated for runs, but ignored during the non-run portions. Distinguishing between runs and non-runs may also allow the apparatus 20 to determine the number of runs performed in a day, season and/or the like. A user may then compare data between runs without having the non-run data interfere or sway the run data. A user may therefore analyze progress from one run to another.

Skiing is provided as an example activity comprising phases. It will be appreciated that the apparatus 20 may distinguish between runs and non-runs for other activities such as surfing (e.g., riding a wave toward a shoreline verses paddling away from the shoreline), downhill mountain biking (e.g., riding down a mountain verses taking a chairlift or vehicle back up the mountain). The apparatus 20 may therefore also identify interval training such as while running or bicycling due to drastic changes in speed. As another example, hill repeats may be automatically distinguished from each other based on patterns in the change in elevations.

FIGS. 6A-6C are example displays of apparatus 20, such as may be provided by user interface 28, when the apparatus 20 is not connected to a holder 300. The displays may be rotated on a time interval, or a user may cycle through various displays such as indicating on the touch screen or via a physical key.

The display of FIG. 6A provides a short summary of a last activity, such as the distance travelled. The display of FIG. 6B provides a current location, or location of last activity. The display of FIG. 6C provides a notification relating to remaining battery capacity.

FIGS. 6D-6H are examples of displays of apparatus 20, such as provided when the apparatus 20 is connected to a holder 300. When the apparatus 20 is attached to the holder, the display may vary further based on whether or not the apparatus 20 is moving, and/or whether a threshold or milestone is reached.

For example, the display of FIG. 6D provides a current speed while the apparatus 20 is moving. The displays of FIGS. 6E and 6F are displays provided while not moving, and may relate to a last session, for example, such as total mileage in FIG. 6E or a maximum speed in FIG. 6F.

The displays of FIGS. 6G and 6H may be provided when a threshold or milestone is achieved. For example, in FIG. 6G, an alert indicating a maximum speed of a session, season, and/or lifetime is provided, and in FIG. 6H, the maximum speed is displayed. Such alerts may be provided momentarily when a milestone is achieved, such as for 5 seconds, and then the display may return to a view such as that of FIG. 6D. Furthermore, an audio indication may be provided such that the user's attention is drawn to the apparatus 20 when a milestone is reached.

FIGS. 6A-6H are provided as example displays and it will be appreciated that any metrics collected with regard to the activity data, sessions, and/or milestones may be provided on the display.

FIG. 7 is a state diagram of the apparatus 20 with regard to power states, and connectivity states to a charger (e.g., USB holder) and/or holders 300. By way of example, but not by limitation, Table 1 below provides a listing of each state including numerals corresponding to numerals in FIG. 7. Table 1 includes a description of the state of the apparatus 20, which sensors may be active and connectivity information relating to the state. A listing of "BT" in the Connectivity column indicates the apparatus 20 may communicate by Bluetooth™ communication.

TABLE 1

| State | Description | Sensors | Connectivity |
|---|---|---|---|
| 700. Powered off (not in holder) | The apparatus 20 is powered off by press of the power button or empty battery. The apparatus 20 is not in use. The display may be blank. Only the power button is monitored. The battery may be in a deep drain mode in which case the apparatus 20 may not respond to the power button and must first be charged. | None | None |
| 702. Charging | The apparatus 20 is put in the charging holder or charger. It may be connected to a USB Charging Port or a USB host or hub. If it is connected to a USB host then there is an opportunity to transfer data. | None | USB, BT |
| 704. Powered On (not in holder) | The apparatus 20 may be removed from the USB holder. The apparatus 20 shows information on the last session. The GPS is on to determine the current location. | GPS (Global Positioning Sattelite) | BT |
| 706. In Holder Not Moving | No motion is detected. Sensors are monitored on an as needed basis, such as every 5 seconds to determine when motion has started. No data is recorded. The goal is to consume as little power as possible. This state times out after a threshold time such as 3 hours; the apparatus 20 powers off and the session ends. This state may be entered during a long break or following an activity in which the user does not remove the apparatus 20 from the holder 300. | As needed | BT |
| 708. In Holder Moving | The apparatus 20 may be clicked into a holder, and is monitoring and recording all sensors. If there is a connected BLE device then data is sent to the external device | All | BT |
| 710. In Holder Powered off | The battery has drained, or the apparatus 20 has timed out while in the holder. | None | None |

Table 1 is provided as a high level description of states. Some states may be further broken down into separate user interface states. For example when the apparatus is in state 708, (In Holder Moving), the data displayed may be different depending on the activity data.

Bluetooth™ communications may be available whenever the apparatus 20 is powered on. This allows the user to program settings and transfer data whenever the apparatus 20 is on.

When the apparatus 20 is clicked into or otherwise seated within a holder 300 a session is started. The NFC tag in the holder 300 provides the apparatus 20 with the activity type and/or the name the user has given to the gear to which the tag is attached. If the tag has not been programmed then the apparatus 20 may alert the user to provide a name. This may be performed using a display of apparatus 20 or another device in communication with the apparatus 20. For example, an application operative on a mobile device may be used to configure the holder 300 and the specific gear. A user may select an activity from a predefined list, and provide a gear name text up to a predefined number of characters, for example.

A session may be stopped when the user removes the apparatus 20 from the holder 300. A session may also be stopped after a timeout of a predefined length of time, such as 3 hours, without detecting any motion when in state 708 (In Holder Moving).

The start and stopping of sessions are described with respect to the various states of the apparatus 20 above. In some embodiments, the manner in which activity data is collected and organized may be dependent on the detection of a connection between the apparatus 20 and a holder 300. A session has been generally described above as starting when a user clicks the apparatus 20 into a holder 300 and terminates when the apparatus 20 has been unclicked, after a timeout of motion, or when the battery runs out. In some embodiments, there may be exceptions to this session management. The capture of session specific activity data with respect to some example embodiments are provided below.

In some examples, apparatus 20 may comprise means, such as communication interface 22, processor 24, and/or the like, for receiving an indication that the apparatus is removed from the holder. In some example, the apparatus 20, such as the processor 24, communication interface 22 or the like, may then receive an indication that the apparatus is returned to the holder within a threshold amount of time. For example, a skier may take a break for 30 minutes. In response to receiving the indication that the apparatus is returned to the holder within the threshold amount of time, the apparatus 20 may resume collecting the activity data in the same session. Alternatively, if the break time exceeds a threshold amount of time, the apparatus 20 may determine that a new session should be started. For example, when a surfer drives to another beach 2 hours away, and reattaches the apparatus 20 after the drive, the apparatus 20 may determine that the data from prior to the drive should be maintained in a different session than the data captured after the drive. This way the user may distinguish the different surfing metrics at the two different beaches.

Similarly, the apparatus 20 may determine whether to continue or to start a new session based on a detected location of the apparatus 20 when the apparatus 20 is removed from the holder 300 and/or returned to the holder 300. For example, in the same surfing example above, when the user surfs in a first location, removes the apparatus 20 from the holder 300, drives to a different beach, and reattaches the apparatus 20, the apparatus 20 may receive an indication that the apparatus 20 is returned to the holder 300 in a second location that is a greater distance from the first location than a threshold distance, of 2 miles, for example. The apparatus 20 may capture data in a new session accordingly. As another example, if a surfer who removes the apparatus 20 from the holder 300 to apply sunscreen, and then returns it to the holder 300, in a close geographical location to the location at which the apparatus 20 was removed from the holder, the apparatus 20 may determine that the data should be collected and applied to the same session.

The intelligent session start and session termination of the apparatus 20 enables the collected activity data to be organized and grouped such that the user may later analyze the data without having to manually organize the data into the desired sessions.

As described above, the time between when a user connects the apparatus 20 to a holder 300 and then removes it is defined as a session. During the session the apparatus 20 collects activity data. As also described above, sessions may be intelligently merged and/or separated. Data may be further distinguished by runs in particular activities as described above.

The apparatus 20 may then calculate maximums, minimums, totals, averages, and other statistical measures for certain types of activity data. Furthermore, any of the metrics can be tracked over a season and/or lifetime. A lifetime may include a span of time for which an individual user has used the apparatus 20 or maintained an account with an application in communication with the apparatus 20. Associating data with an account in a remote application and/or server may enable continuity in the event an apparatus 20 is lost and needs to be replaced.

A season may be considered a period of time for which one does an activity. For most this would be a calendar year but for snow sports in the northern hemisphere the season may only include the winter months. A user may want to know how many miles they cycled in a year, how many vertical feet the user skied in a season, and/or what's the fasted they've sailed in a season for example. A season may start on a particular day in the year depending on the activity type, and may vary according to the location in the world. Session data may be accumulated into season data, and season data may be accumulated into lifetime data.

Live data may include data that is instantaneous, or near-instantaneous, including cumulative counters that are updated instantaneously or near-instantaneously.

Table 2 below provides activity category codes and corresponding activity types associated with the activity category. Similar activities are therefore grouped such that the same or similar metrics are collected for activity types assigned to the same category.

TABLE 2

| Activity Category Code | Description | Example Activities |
| --- | --- | --- |
| D | Downhill | skiing, snowboarding, downhill maintain biking. A lift is involved. |
| F | Foot | walking, hiking, running, cross-country skiing |
| B | Biking | road biking, mountain biking |
| S | Surfing | surfing |
| W | Water | kayaking, paddle boarding, sailing, windsurfing, kite surfing |
| G | Generic | Other, unknown |

The categories may be reconfigured if necessary or customized as additional activities are added. The categories dictate which metrics and at which intervals milestones are tracked, as provided below in Table 3, also by way of example but not by limitation. For example, when a connection between apparatus 20 and a holder 300 designated for road biking is detected, the apparatus 20 may collect metrics according to the specification set forth in Table 3, for category 'B.'

Table 3 lists various metric collected by apparatus 20, further grouped by a general metrics category indicated in the leftmost column, such as speed, distance, etc. The particular metric such as current speed, maximum speed, and/or the like is tracked for an activity category for a particular term if the activity category code (taken from Table 2) is listed under the particular term, timeframe, or span of time. For example, current speed is captured in real time or 'live' for all activity categories, but current speed does not apply to life time.

TABLE 3

|  | Metric | Live | Run | Session | Month | Season | Lifetime |
|---|---|---|---|---|---|---|---|
| Speed | Current Speed | DFBSWG |  | DFBSWG | DFBSWG |  |  |
|  | Max Speed | DFBSWG | DS | DFBSWG | DFBSWG | DFBSWG | DFBSWG |
|  | AVG (average) Speed | DFBSWG | DS | DFBWG | DFBWG | DFBW | DFBW |
| Distance | Total Distance | DFBSWG | DS | DFBSWG | DFBSWG | DFBSWG | DFBSWG |
|  | Total Steps | F |  | F | F | F | F |
| Runs/Waves | Total Number of runs | DS | DS | DS | DS | DS | DS |
|  | Start time of Run |  | DS |  |  |  |  |
|  | Total Run Duration | DS | DS | DS | DS | DS | DS |
|  | Total Run Distance | DS | DS | DS | DS | DS | DS |
| Days | Total Days an Activity was done |  |  |  |  | DFBSWG | DFBSWG |
| Airtime | Total Airtime | DBSG | DS | DBSG | DBSG | DBSG | DBSG |
| Time | Clock time | DFBSWG |  |  |  |  |  |
|  | Start time of Session |  |  | DFBSWG | DFBSWG |  |  |
|  | Total Duration moving | DFBSG | DS | DFBSG | DFBSG | DFBSG | DFBSG |
|  | Total Duration (Lift/paddling) | DS | DS | DS | DS | DS | DS |
|  | Total Duration | DFBSWG | DS | DFBSWG | DFBSWG | DFBSWG | DFBSWG |
|  | Total Days (for Gear/Activity) |  |  |  |  | DFBSWG | DFBSWG |
| Altitude | Current Altitude | DFBWG |  | DFBWG | DFBWG |  |  |
|  | Minimum Altitude | DFBG | D | DFBG | DFBG | DFBG | DFBG |
|  | Maximum Altitude | DFBG | D | DFBG | DFBG | DFBG | DFBG |
|  | Total Descent | DFBG | D | DFBG | DFBG | DFBG | DFBG |
|  | Total Ascent | FBG |  | FBG | FBG | FBG | FBG |
|  | Current Rate of Ascent | DBFG |  |  |  |  |  |
|  | Max rate of Descent | DBFG | D | DBFG | DBFG | DBFG | DBFG |
|  | Max rate of Ascent | BFG |  | BFG | BFG | BFG | BFG |
| Grade | Current Grade | DBFG | D | DBFG | DBFG | DBFG | DBFG |
|  | Max Grade | DBFG | D | DBFG | DBFG | DBFG | DBFG |
|  | Min Grade | DBFG |  | DBFG | DBFG | DBFG | DBFG |
| Location | Current Location Latitude/Longitude | DFBSWG | DS | DFBSWG | DFBSWG |  |  |
|  | Place Name (fine) | DFBSWG |  |  |  |  |  |
|  | Place Name (course) | DFBSWG |  |  |  |  |  |
|  | Current Heading | DFBSWG |  |  |  |  |  |
| Temperature | Current Temperature | DFBSWG |  | DFBSWG | DFBSWG |  |  |
|  | Max Temperature | DFBSWG | DS | DFBSWG | DFBSWG | DFBSWG | DFBSWG |
|  | Min Temperature | DFBSWG | DS | DFBSWG | DFBSWG | DFBSWG | DFBSWG |
|  | AVG Temperature | DFBSWG | DS | DFBSWG | DFBSWG | DFBSWG | DFBSWG |
| Biometric | Total Calories | DFBSWG |  |  |  |  |  |
|  | Current Calories per hour | DFBSWG | DS |  |  |  |  |
|  | AVG Calories | DFBSWG | DS |  |  |  |  |
|  | Current Heart Rate | DFBSWG |  |  |  |  |  |
|  | AVG Heart Rate | DFBSWG | DS | DFBSGW |  | DFBSWG | DFBSWG |

TABLE 3-continued

| Metric | Live | Run | Session | Month | Season | Lifetime |
|---|---|---|---|---|---|---|
| Max Heart Rate | DFBSWG | DS | DFBSWG | | DFBSWG | DFBSWG |
| Min Heart Rate | DFBSWG | DS | DFBSWG | | DFBSWG | DFBSWG |
| Heart Rate Zone | DFBSWG | | | | | |

Table 3 above provides general rules for capturing activity data with respect to the activity type and terms. Additional rules may apply to the data provided above. For example, for water activities, such as sailing, speed may be captured and/or displayed as knots. For foot activities, pace may be used such as miles/minute. Average speed may be calculated such that periods when the apparatus 20 is not moving are removed.

Distance may be the distance covered while performing the activity so for downhill snow sports it does not include distances on a lift. For surfing it only includes the distance on a surf board. In an example embodiment, the total number of runs may increment when a run has been detected, not when it has ended.

Duration moving excludes time in which the user is stationary. For some sports (surfing, and downhill categories) the duration also excludes times expended preparing for or positioning oneself for the actual activity.

In some embodiments, altitude may be used rather than the ground based elevation as some activities may be airborne. Altitude may include negative numbers to account for being below sea level.

As described above, the apparatus 20 measures and calculates activity-specific, multi-level session motion metrics, without requiring the user to start or end activity sessions or enter an activity type. Highlights and milestones may therefore be detected by the processor based on the collected data. A highlight is a notable achievement in a user's activity data that satisfies a predefined criteria and may trigger a display badge or other alert provided by user interface 28.

A highlight may include reaching a certain milestone in terms of a new maximum or a total reaching some predetermined value. A highlight may also include detection of a peak motion event such as related to airtime. A highlight may also be triggered by reaching a geo-location such as the peak of a mountain. When a highlight is detected it is recorded and a notification is created. When a highlight is created the data is stored with the session data and also optionally transmitted to an external device, so as to be provided to a mobile application for activity data analysis, for example.

In some embodiments, the apparatus 20 may include means such as processor 20 and/or memory 26 for tracking milestones for particular activities. For example, maximum speeds for running may vary greatly compared to maximum speeds for bicycling. As another example, a 50 mile milestone in a session might be appropriate for biking, while 10 miles might be more appropriate for snowboarding. Milestones may be tracked for any of a session, season (e.g., year, or several months of a ski season), or lifetime.

In some embodiments, the apparatus 20 may include means such as processor 20 and/or memory 26 for associating the collected activity data with a particular piece of gear. In this regard, as described above, a user may configure the apparatus 200 to recognize different holders 300 and the user may provide a name to the piece of gear and/or equipment to which the holder is mounted so that the gear may be easily identified while analyzing data. The apparatus 20 may track milestones for the activity type and the particular piece of gear. For example, consider a time trial bike which may obtain faster average speeds than a road bike. Although the activity type may be the same on both pieces of equipment, the apparatus 20 may distinguish the data and provide milestones for each piece of equipment independently of others. As another example, gear-specific milestones may be a convenient way to determine that following 1,000 miles on a specific bicycle, routine maintenance should be performed. Gear specific data may also be tracked for any of a session, season, and/or lifetime. For example, for road biking there might be milestones at 50 miles for a session, 5,000 miles for a season and 50,000 for a lifetime.

There may be a record of each minimum and maximum parameter maintained for each session, for the season and for the lifetime. The date, time, location and/or a reference to the originating session in which the minimum or maximum occurred may be recorded. If the maximum or minimum in a session exceeds the corresponding value in a season and/or lifetime then the apparatus, such as with processor 20 and/or memory 26 may replace the prior value with the new value from the session and optionally trigger a milestone event.

The processor 24 may operate in accordance with an algorithm to prevent multiple milestones being generated as a new maximum is being created. For example if the current maximum speed is 10 miles per hour then multiple highlights should not be created as the speed increases to 11, 12, 13 miles per hour etc. For example, no maximum highlight is generated while the value is still increasing. A delay, such as 5 to 10 seconds, may be enforced following a decrease in speed before reporting the maximum highlight to ensure that any decrease was not just a momentary decrease. The algorithm may need to be modified for different maximums of speed, temperature, grade and altitude. The processor 24 may utilize a comparable algorithm for minimums with appropriate changes to trend directions so as to detect minimums and to insert a delay upon detection of an increase.

There may be a record, such as in memory 26, of the maximum value of each total parameter maintained for each session, season and for the lifetime. The date, time, location and a reference to the originating session of the maximal total shall be recorded.

If the total in a session exceeds the corresponding value in a season and/or lifetime then the processor 24 of an example embodiment may replace the value with the new value from the session and optionally trigger a milestone event. In addition to storing the maximum session total for a season or lifetime, the processor 24 may calculate cumulative totals for a season and a lifetime.

The processor 24 of an example embodiment may also record the maximum total in a lifetime category such as in memory 26. If a season's total exceeds that maximum, the processor 24 may trigger a milestone event. The processor 24 of an example embodiment generates a total milestone event when the total is exceeded rather than at the end of the session. The total milestone event is generally provided only once in a session so as not to overwhelm the user or provide extraneous data.

Data collection for averages may follow rules similar to that for minimum and maximum. In this regard, the processor 24 of an example embodiment may record each minimum and maximum of an average parameter maintained for each season and for the lifetime, such as in memory 26. The date, time, location and a reference to the originating session of the minimum or maximum may be recorded by the processor 24. If the average parameter in a session exceeds the corresponding minimum or maximum value in a season and/or lifetime, then the processor 24 of an example embodiment replaces that value with the new value from the session and a milestone event triggered. In some example embodiments, the average milestone may only be generated at the end of a session.

In some examples, the apparatus 20, such as with processor 24 records data with respect to a milestone may include, identification of the activity such as date, time and/or location, the activity data, and indication as to whether the milestone is for a session, season or lifetime. Data with respect to highlights may be saved in a session log such as on memory 26, and may be transferred to another device via the communication interface 22, and from the other, device to the cloud. The recoded data may include a timestamp and reference to the applicable session data so a user browsing past highlights can review the sessions.

If there is an external device in communication with the apparatus 20, then the processor 20 may direct the communication interface 22 to transfer the data such as via Bluetooth™ or another communication protocol, to an application on the external device as soon as the highlight occurs. In some examples the external device polls the apparatus 20, and the time between highlight detection and reporting to the external device is determined by the polling rate. If there is no external device in communication with the apparatus 20, then the data may be transferred as soon as an external device is detected.

A user of the apparatus 20 may therefore efficiently move the apparatus 20 from one holder to another in between activities. No other input is required, such as to configure the correct activity type and/or select start and finish indicators to capture the accurate data for the activate portions of a session only. The detection of the activity type and the start and finish times of the session may be determined automatically. The metrics to collect may therefore be intelligently identified, and the collected activity data may be organized accordingly. User forgetfulness in starting and/or stopping a device would not have a detrimental impact on the data collection by apparatus 20, because the apparatus 20 handles the start and stop times based on connectivity to holders, and other related rules.

As such, the method, apparatus and computer program product provide numerous technical advantages including the conservation of processing resources and the associated power consumption otherwise expended to support the display of information needed for a user to otherwise configure the apparatus 20 prior to each use, for each specific type of activity performed.

In addition to supporting the collection of activity data, the computing device and/or apparatus 20 provided herein may be configured to support one or more other functions. For example, the computing device of an example embodiment may also support a mapping application so as to present maps or otherwise provide mapping information. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or global positioning system (GPS) data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database can be a master geographic database, but in alternate embodiments, the client side geographic database can represent a compiled navigation database that can be used in or with the computing device to provide navigation and/or map-related functions. For example, the geographic database can be used with the end user device to provide an end user with navigation features. In such a case, the geographic database can be downloaded or stored on the computing device, such as in applications, or the computing device can access the geographic database through a wireless or wired connection (such as via a server and/or a communication network), for example.

In one embodiment, the computing device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display.

Thus, a user can use the computing device of an example embodiment to analyze activity data as it applies to the traveled route during the course of an activity. For example, a user may view highlights and milestones overlaid on a map or an elevation plot. Additionally or alternatively, a user may view a real time location on the apparatus 20.

As described above, FIG. 5 illustrates a flowchart of operations of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining a plurality of metrics corresponding to activity data to be collected by an apparatus, the method comprising:

receiving, by a processor of the apparatus and via a proximity based communication, an indication that the apparatus is connected to a holder, the indication comprising a holder identifier, the apparatus comprising the processor, a memory storing computer program code, and one or more sensors, the holder comprising (a) one or more fastening mechanisms configured to fasten the apparatus into the holder such that a holder tag configured to communicate with the apparatus via the proximity based communication is positioned in a position in which the apparatus is configured to receive the holder identifier from the tag via the proximity based communication and (b) one or more securing mechanisms for securing the holder to at least one of a user's body or activity equipment appropriate for a category of physical activity corresponding to the holder;

receiving, by the processor, an indication of a detected movement, the movement detected by at least one of the one or more sensors;

responsive to receiving at least one of (a) the indication that the apparatus is connected to the holder or (b) the indication of the detected movement, determining, by the processor, whether data stored in a memory of the apparatus associates the holder identifier with an activity type, wherein the activity type indicates the category of physical activity engaged in by a user of the apparatus when the apparatus is connected to the holder;

responsive to determining that the data stored in the memory of the apparatus associates the holder identifier with an activity type, identifying the activity type by executing at least a portion of the computer program code by the processor to process the holder identifier to determine the activity type associated with the holder identifier by the data stored in the memory of the apparatus;

responsive to determining that the data stored in the memory of the apparatus does not associate the holder identifier with an activity type, identifying the activity type by executing at least a portion of the computer program code by the processor to process at least one of a speed or a direction of the movement of the apparatus;

identifying, by executing at least a portion of the computer program code by the processor, a plurality of metrics for which to collect the activity data based on the activity type, wherein the plurality of metrics correspond to the category of physical activity indicated by the identified activity type; and collecting, via the one or more sensors, the activity data for the identified plurality of metrics.

2. The method of claim 1, further comprising:
determining that the activity type is an activity comprising phases, wherein collecting the activity data comprises distinguishing between the phases.

3. The method of claim 1, further comprising:
receiving an indication that the apparatus is removed from the holder;
receiving an indication that the apparatus is returned to the holder within a threshold amount of time; and
in response to receiving the indication that the apparatus is returned to the holder within the threshold amount of time, resuming collecting the activity data in a same session.

4. The method of claim 1, further comprising:
receiving an indication that the apparatus is removed from the holder in a first location;
receiving an indication that the apparatus is returned to the holder in a second location that is a greater distance from the first location than a threshold distance; and
in response to receiving the indication that the apparatus is returned to the holder in a second location that is a greater distance from the first location than a threshold distance, resuming collecting the activity data in a different session.

5. The method of claim 1, further comprising:
associating the collected activity data with a particular piece of gear; and
tracking milestones for the activity type and the particular piece of gear.

6. The method of claim 5, further comprising:
tracking milestones for at least one of a session, season, or lifetime.

7. A system for collecting activity data, the system comprising:
a holder comprising:
one or more fastening mechanisms configured to fasten an apparatus into the holder such that a holder tag configured to communicate with the apparatus via a proximity based communication is positioned in a position in which the apparatus is configured to receive a holder identifier from the tag via the proximity based communication, and
one or more securing mechanisms for securing the holder to at least one of a user's body or activity equipment appropriate for a category of physical activity corresponding to the holder; and the apparatus comprising at least one processor, at least one memory including computer program code, and one or more sensors, the at least one memory and the computer program code configured to, with the processor, cause the apparatus to perform at least:
receiving, via a proximity based communication, an indication that the apparatus is connected to a holder, the indication comprising a holder identifier;
receiving an indication of a detected movement, the movement detected by at least one of the one or more sensors;
responsive to receiving at least one of (a) the indication that the apparatus is connected to the holder or (b) the indication of the detected movement, determining, by the processor, whether data stored in a memory of the apparatus associates the holder identifier with an activity type, wherein the activity type indicates the category of physical activity engaged in by a user of the apparatus when the apparatus is connected to the holder;
responsive to determining that the data stored in the memory of the apparatus associates the holder identifier with an activity type, identifying the activity type by executing at least a portion of the computer program code by the processor to process the holder identifier to determine the activity type associated with the holder identifier by the data stored in the memory of the apparatus;
responsive to determining that the data stored in the memory of the apparatus does not associate the holder identifier with an activity type, identifying the activity type by executing at least a portion of the computer program code by the processor to process at least one of a speed or a direction of the movement of the apparatus;
identifying, by executing at least a portion of the computer program code by the processor, a plurality of metrics for which to collect the activity data based on the activity type, wherein the plurality of metrics correspond to the category of physical activity indicated by the identified activity type; and collecting, via the one or more sensors, the activity data for the identified plurality of metrics.

8. The apparatus of claim 7, wherein the at least one memory and the computer program code are further configured to, with the processor, cause the apparatus to perform at least:
determining that the activity type is an activity comprising phases, wherein collecting the activity data comprises distinguishing between the phases.

9. The apparatus of claim 7, wherein the at least one memory and the computer program code are further configured to, with the processor, cause the apparatus to perform at least:
receiving an indication that the apparatus is removed from the holder;
receiving an indication that the apparatus is returned to the holder within a threshold amount of time; and
in response to receiving the indication that the apparatus is returned to the holder within the threshold amount of time, resuming collecting the activity data in a same session.

10. The apparatus of claim 7, wherein the at least one memory and the computer program code are further configured to, with the processor, cause the apparatus to perform at least:
receiving an indication that the apparatus is removed from the holder in a first location;
receiving an indication that the apparatus is returned to the holder in a second location that is a greater distance from the first location than a threshold distance; and
in response to receiving the indication that the apparatus is returned to the holder in a second location that is a greater distance from the first location than a threshold distance, resuming collecting the activity data in a different session.

11. The apparatus of claim 7, wherein the at least one memory and the computer program code are further configured to, with the processor, cause the apparatus to perform at least:
associating the collected activity data with a particular piece of gear; and
tracking milestones for the activity type and the particular piece of gear.

12. The apparatus of claim 11, wherein the at least one memory and the computer program code are further configured to, with the processor, cause the apparatus to perform at least:
tracking milestones for at least one of a session, season, or lifetime.

13. A computer program product for collecting activity data, the computer program product comprising at least one non-transitory computer-readable storage medium having computer-executable program code instructions stored therein, the computer-executable program code instructions comprising program code instructions for:
receiving, by an apparatus and via a proximity based communication, an indication that the apparatus is connected to a holder, the holder comprising (a) one or more fastening mechanisms configured to fasten the apparatus into the holder such that a holder tag configured to communicate with the apparatus via the proximity based communication is positioned in a position in which the apparatus is configured to receive the holder identifier from the tag via the proximity based communication and (b) one or more securing mechanisms for securing the holder to at least one of a user's body or activity equipment appropriate for a category of physical activity corresponding to the holder;
receiving an indication of a detected movement, the movement detected by a sensor;
responsive to receiving at least one of (a) the indication that the apparatus is connected to the holder or (b) the indication of the detected movement, determining, by the processor, whether data stored in a memory of the apparatus associates the holder identifier with an activity type, wherein the activity type indicates the category of physical activity engaged in by a user of the apparatus when the apparatus is connected to the holder;
responsive to determining that the data stored in the memory of the apparatus associates the holder identifier with an activity type, identifying the activity type by executing at least a portion of the computer program code by the processor to process the holder identifier to determine the activity type associated with the holder identifier by the data stored in the memory of the apparatus;
responsive to determining that the data stored in the memory of the apparatus does not associate the holder identifier with an activity type, identifying the activity type by executing at least a portion of the computer program code by the processor to process at least one of a speed or a direction of the movement of the apparatus;
identifying, by executing at least a portion of the computer program code by the processor, a plurality of metrics for which to collect the activity data based on the activity type, wherein the plurality of metrics correspond to the category of physical activity indicated by the identified activity type; and
collecting, via one or more sensors, the activity data for the identified plurality of metrics.

14. The computer program product of claim 13, wherein the computer-executable program code instructions further comprise program code instructions for:
determining that the activity type is an activity comprising phases, wherein collecting the activity data comprises distinguishing between the phases.

15. The computer program product of claim 13, wherein the computer-executable program code instructions further comprise program code instructions for:
receiving an indication that the apparatus is removed from the holder;
receiving an indication that the apparatus is returned to the holder within a threshold amount of time; and
in response to receiving the indication that the apparatus is returned to the holder within the threshold amount of time, resuming collecting the activity data in a same session.

16. The computer program product of claim 13, wherein the computer-executable program code instructions further comprise program code instructions for:
receiving an indication that the apparatus is removed from the holder in a first location;
receiving an indication that the apparatus is returned to the holder in a second location that is a greater distance from the first location than a threshold distance; and
in response to receiving the indication that the apparatus is returned to the holder in a second location that is a greater distance from the first location than a threshold distance, resuming collecting the activity data in a different session.

17. The computer program product of claim 13, wherein the computer-executable program code instructions further comprise program code instructions for:
   associating the collected activity data with a particular piece of gear; and
   tracking milestones for the activity type and the particular piece of gear.

18. The computer program product of claim 17, wherein the computer-executable program code instructions further comprise program code instructions for:
   tracking milestones for at least one of a session, season, or lifetime.

19. The method of claim 1, wherein the apparatus comprises a global navigation satellite system (GNSS) sensor and activity data corresponding to at least one metric of the plurality of metrics is determined based at least in part on a signal received from the GNSS sensor.

* * * * *

UNITED STATES PATENT AND TRADEMARK OFFICE
CERTIFICATE OF CORRECTION

PATENT NO. : 10,241,127 B2
APPLICATION NO. : 14/540261
DATED : March 26, 2019
INVENTOR(S) : Adams et al.

Page 1 of 1

It is certified that error appears in the above-identified patent and that said Letters Patent is hereby corrected as shown below:

On the Title Page

Delete:
"Related U.S. Application Data
(63) Continuation-in-part of application no. 12/512,878,
filed on Jul 30, 2009, now abandoned, and a
continuation-in-part of application No. 12/512,809,
Filed on Jul 30, 2009."

Signed and Sealed this
Nineteenth Day of November, 2019

Andrei Iancu
*Director of the United States Patent and Trademark Office*